US011722705B2

(12) United States Patent
Ucar et al.

(10) Patent No.: US 11,722,705 B2
(45) Date of Patent: Aug. 8, 2023

(54) CAMERA SUPPORT BY A VEHICULAR MICRO CLOUD FOR REMOTE DRIVING

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 57 days.

(21) Appl. No.: 16/831,042

(22) Filed: Mar. 26, 2020

(65) Prior Publication Data
US 2021/0306682 A1   Sep. 30, 2021

(51) Int. Cl.
*H04W 4/46* (2018.01)
*H04N 21/218* (2011.01)
(Continued)

(52) U.S. Cl.
CPC ....... *H04N 21/21805* (2013.01); *B60R 11/04* (2013.01); *G06T 7/80* (2017.01);
(Continued)

(58) Field of Classification Search
CPC ......... G05D 1/0246; G05D 2201/0213; G06V 20/56; G06V 20/588; G06V 20/52;
(Continued)

(56) References Cited

U.S. PATENT DOCUMENTS

| 7,100,190 B2 * | 8/2006 | Johnson | H04N 21/2743 |
| | | | 348/E7.071 |
| 7,877,196 B2 * | 1/2011 | Lin | G08G 1/0104 |
| | | | 701/119 |

(Continued)

FOREIGN PATENT DOCUMENTS

WO   WO-2017189035 A1 * 11/2017

OTHER PUBLICATIONS

Lee et al., "Vehicular Cloud Networking: Architecture and Design Principles," IEEE Communications Magazine, vol. 52, Issue 2, p. 148-155 (2014).

(Continued)

*Primary Examiner* — Daniel Chang
(74) *Attorney, Agent, or Firm* — Christopher G. Darrow; Darrow Mustafa PC (57) ABSTRACT

Systems and methods for controlling a view, provided by a vehicular micro cloud associated with a remotely supported vehicle, can include communicating with a plurality of vehicles in a vicinity of the remotely supported vehicle to collectively form a vehicular micro cloud. Each of the plurality of vehicles being equipped with at least one camera can track respective positions of the plurality of vehicles relative to the remotely supported vehicle. A set of vehicles can be selected from among the plurality of vehicles. A live video stream can be received from each of the set of vehicles. The live video stream can be transmitted to an external controller.

20 Claims, 6 Drawing Sheets

(51) Int. Cl.
| | |
|---|---|
| *H04W 4/40* | (2018.01) |
| *H04W 4/02* | (2018.01) |
| *H04N 21/2187* | (2011.01) |
| *H04N 7/18* | (2006.01) |
| *H04N 13/282* | (2018.01) |
| *G06T 7/80* | (2017.01) |
| *B60R 11/04* | (2006.01) |
| *H04N 21/81* | (2011.01) |

(52) U.S. Cl.
CPC ........... *H04N 7/181* (2013.01); *H04N 13/282* (2018.05); *H04N 21/2187* (2013.01); *H04N 21/816* (2013.01); *H04W 4/023* (2013.01); *H04W 4/40* (2018.02); *G06T 2207/10016* (2013.01); *G06T 2207/30252* (2013.01)

(58) Field of Classification Search
CPC ........... H04W 4/40; H04W 4/44; H04W 4/46; H04W 4/029; H04W 4/38; H04W 84/18; H04W 24/08; H04W 4/021; H04W 12/63; H04L 67/12; H04L 67/10; H04L 2209/84; G08G 1/166; G08G 1/0112; G08G 1/096725; G08G 1/096791; G08G 1/0141; G08G 1/22; G08G 1/161; G08G 1/20; G08G 1/0965
See application file for complete search history.

(56) References Cited

U.S. PATENT DOCUMENTS

| | | | | |
|---|---|---|---|---|
| 8,255,144 | B2 * | 8/2012 | Breed | G01S 17/86 340/436 |
| 8,819,313 | B1 * | 8/2014 | Walther | G08G 1/04 709/224 |
| 9,123,241 | B2 * | 9/2015 | Grigsby | H04W 8/18 |
| 9,786,154 | B1 * | 10/2017 | Potter | G08B 25/00 |
| 9,832,429 | B2 * | 11/2017 | Seymour | G08G 1/163 |
| 10,074,279 | B1 * | 9/2018 | Xu | G08G 1/096725 |
| 10,210,406 | B2 * | 2/2019 | Huang | G01C 21/32 |
| 10,222,228 | B1 * | 3/2019 | Chan | G01C 21/3667 |
| 11,589,080 | B2 * | 2/2023 | McQuillen | H04N 21/47202 |
| 11,589,082 | B2 * | 2/2023 | Goluguri | H04N 21/47202 |
| 2002/0090217 | A1 * | 7/2002 | Limor | H04N 21/21805 396/429 |
| 2002/0116722 | A1 * | 8/2002 | Graber | H04N 21/6581 348/E7.054 |
| 2005/0065715 | A1 * | 3/2005 | Watanabe | G01C 21/26 701/517 |
| 2009/0231158 | A1 * | 9/2009 | Grigsby | G06F 3/04847 340/902 |
| 2009/0234859 | A1 * | 9/2009 | Grigsby | G08G 1/161 |
| 2010/0198513 | A1 * | 8/2010 | Zeng | G01S 17/89 701/300 |
| 2010/0250132 | A1 * | 9/2010 | Zeng | G01S 19/43 701/472 |
| 2010/0256836 | A1 * | 10/2010 | Mudalige | G08G 1/164 701/2 |
| 2010/0256852 | A1 * | 10/2010 | Mudalige | G08G 1/164 701/24 |
| 2010/0328499 | A1 * | 12/2010 | Sun | H04N 5/23238 348/239 |
| 2011/0164562 | A1 * | 7/2011 | Qiu | H04W 72/543 370/328 |
| 2012/0022764 | A1 * | 1/2012 | Tang | B60W 50/0097 701/102 |
| 2012/0068009 | A1 * | 3/2012 | Bossert | F41F 3/07 244/63 |
| 2012/0133778 | A1 * | 5/2012 | Shih | H04N 7/185 348/169 |
| 2013/0342333 | A1 * | 12/2013 | Hutchings | G08B 13/19647 348/148 |
| 2015/0025655 | A1 * | 1/2015 | Walther | G08G 1/04 700/9 |
| 2015/0153176 | A1 * | 6/2015 | Lim | H04W 4/02 701/408 |
| 2015/0350505 | A1 * | 12/2015 | Malkin | G03B 5/06 348/357 |
| 2016/0109617 | A1 * | 4/2016 | Hiroi | G01W 1/00 348/148 |
| 2016/0205418 | A1 * | 7/2016 | Ho | G06F 16/70 725/109 |
| 2016/0212596 | A1 * | 7/2016 | Brahmi | H04W 72/042 |
| 2016/0243441 | A1 * | 8/2016 | Garbowski | A63F 13/65 |
| 2017/0010618 | A1 * | 1/2017 | Shashua | G06F 16/29 |
| 2017/0134086 | A1 * | 5/2017 | Liu | H04B 7/18502 |
| 2017/0308082 | A1 * | 10/2017 | Ullrich | G05D 1/0297 |
| 2017/0342931 | A1 * | 11/2017 | Dudar | F02D 41/222 |
| 2017/0346878 | A1 * | 11/2017 | Baker | H04L 67/125 |
| 2017/0347002 | A1 * | 11/2017 | Baker | G06V 20/56 |
| 2017/0352275 | A1 * | 12/2017 | Maruyama | G06T 7/70 |
| 2018/0077518 | A1 | 3/2018 | Nguyen et al. | |
| 2018/0082135 | A1 * | 3/2018 | Crawford | B60R 11/04 |
| 2018/0111611 | A1 * | 4/2018 | MacNeille | G08G 1/166 |
| 2018/0113472 | A1 * | 4/2018 | Sakr | G05D 1/0276 |
| 2018/0139593 | A1 * | 5/2018 | Chun | H04W 4/46 |
| 2018/0167790 | A1 * | 6/2018 | Cavalcanti | H04W 4/44 |
| 2018/0194286 | A1 * | 7/2018 | Stein | B60W 10/22 |
| 2019/0043135 | A1 * | 2/2019 | Kawamoto | G06Q 40/08 |
| 2019/0050904 | A1 * | 2/2019 | Wasserman | G08G 1/0116 |
| 2019/0052653 | A1 * | 2/2019 | Galula | B60R 16/02 |
| 2019/0052915 | A1 * | 2/2019 | McQuillen | H04N 21/4223 |
| 2019/0064831 | A1 * | 2/2019 | Gali | G05D 1/0214 |
| 2019/0096244 | A1 * | 3/2019 | Guruva Reddiar | G06V 20/582 |
| 2019/0096265 | A1 * | 3/2019 | Mok | G08G 1/163 |
| 2019/0129440 | A1 * | 5/2019 | Borhan | G05D 1/0223 |
| 2019/0132709 | A1 * | 5/2019 | Graefe | G08G 1/096716 |
| 2019/0139421 | A1 * | 5/2019 | Nilsson | G05D 1/106 |
| 2019/0164430 | A1 * | 5/2019 | Nix | B60R 1/002 |
| 2019/0171227 | A1 * | 6/2019 | Sujan | G05D 1/0295 |
| 2019/0174276 | A1 | 6/2019 | Mineiro Ramos de Azevedo | |
| 2019/0220037 | A1 * | 7/2019 | Vladimerou | G08G 1/22 |
| 2019/0278298 | A1 | 9/2019 | Pedersen et al. | |
| 2019/0302761 | A1 | 10/2019 | Huang et al. | |
| 2019/0384294 | A1 * | 12/2019 | Shashua | G05D 1/0253 |
| 2020/0007661 | A1 | 1/2020 | Kim | |
| 2020/0064142 | A1 * | 2/2020 | Choi | G01C 21/3407 |
| 2020/0073969 | A1 * | 3/2020 | Kursar | G06V 20/56 |
| 2020/0160626 | A1 * | 5/2020 | Lei | G07C 5/0808 |
| 2020/0209847 | A1 * | 7/2020 | Park | H04N 23/951 |
| 2020/0221271 | A1 * | 7/2020 | Kim | H04L 5/0053 |
| 2020/0221423 | A1 * | 7/2020 | Wang | H04W 72/02 |
| 2020/0363211 | A1 * | 11/2020 | Furuichi | G01C 21/30 |
| 2021/0003413 | A1 * | 1/2021 | Woo | G01C 21/3605 |
| 2021/0029385 | A1 * | 1/2021 | Lee | B62J 50/40 |
| 2021/0056770 | A1 * | 2/2021 | Moradi Pari | G08G 1/096725 |
| 2021/0061306 | A1 * | 3/2021 | Dagan | G08G 1/0104 701/119 |
| 2021/0114616 | A1 * | 4/2021 | Altman | G05D 1/106 |
| 2021/0172749 | A1 * | 6/2021 | Shin | G08G 1/096716 |
| 2021/0227364 | A1 * | 7/2021 | Muehleisen | H04W 4/44 |
| 2021/0307029 | A1 * | 9/2021 | Uchiyama | H04W 72/0446 |

OTHER PUBLICATIONS

Higuchi et al., "How to Keep a Vehicular Micro Cloud Intact," 2018 IEEE 87th Vehicular Technology Conference (VTC Spring), 5 pages.

Gerla, "Vehicular Cloud Computing," 2012 The 11th Annual Mediterranean Ad Hoc Networking Workshop (Med-Hoc-Net), p. 152-155.

* cited by examiner

| VID | Dest | Cam1 | Cam2 | Cam3 | Location | Zone |
|---|---|---|---|---|---|---|
| 1145 | 1431 7th St. NE | Front/Hres/On | Rear/Lres/Off | Rside/Lres/Off | 38.12, 77.4 | 1 |
| 1151 | 900 4th St. NW | Front/Mres/On | Rear/Lres/Off | None | 38.34, 76.9 | 2 |
| ... | ... | ... | ... | ... | ... | ... |

400

410 { VID, Dest }
420 { Cam1, Cam2, Cam3 }
430 { Location, Zone }

402 → row 1145
404 → row 1151

CAMERA SUPPORT BY A VEHICULAR MICRO CLOUD FOR REMOTE DRIVING

TECHNICAL FIELD

The subject matter described herein relates, in general, to a system and method for providing remote support of a vehicle, and, more particularly, to providing and controlling one or more cameras via a vehicular micro cloud to provide multiple views of a vehicle being remotely supported or driven.

BACKGROUND

Two or more vehicles can establish communications connections (e.g., via vehicle-to-everything, i.e., "V2X" communication protocol) to form a group of interconnected vehicles that are located within a common vicinity. Such groups are known as "vehicular micro clouds" or simply "micro clouds." Vehicle members in a micro cloud (i.e., "members") can have varying types of equipment, computing resources and capabilities, for example, depending on the model/make of the vehicle. Members in a micro cloud can share their capabilities and computing resources with other members of the micro cloud to collaborate on operational tasks, such as, for example, environmental sensing, data processing and data storage.

Providing "remote support" for a vehicle can include remotely issuing a command to the vehicle based on a current situation and/or remote driving of the vehicle. "Remote driving" refers to using controls to remotely drive a vehicle from a distance where a remote operator of the vehicle is not seated in the vehicle. In remote driving, the remote operator accesses a system that can allow, for example, remote control of vehicle operations such as steering, applying gas, braking, etc. Since the remote operator is not seated within the vehicle, in providing remote support it is critical for the remote operator to obtain one or more views of the environment and vicinity of the vehicle in real time to allow operation of the vehicle without collision.

SUMMARY

The disclosed devices, systems and methods relate to providing remote support for a vehicle, which can include supporting remote driving, by utilizing a vehicular micro cloud to provide one or more views of a remotely supported vehicle to a remote operator of the vehicle. By observing the one or more views, the remote operator can accurately issue support commands to the vehicle or even remotely drive the vehicle.

In one embodiment, a system can include a communication system configured to transmit/receive communications between the system and vehicle members of a vehicular micro cloud, one or more processors one or more processors, and a memory communicably coupled to the one or more processors. The memory can store a connection module including instructions that when executed by the one or more processors cause the one or more processors to communicate with a plurality of vehicles in a vicinity of the vehicle to collectively form (or join) the vehicular micro cloud, each of the plurality of vehicles being equipped with at least one camera.

The memory can also store a tracking module including instructions that when executed by the one or more processors cause the one or more processors to track respective positions of the plurality of vehicles relative to the vehicle.

In addition, the memory can store a transmission module including instructions that when executed by the one or more processors cause the one or more processors to select a set of vehicles from among the plurality of vehicles, receive a live video stream from each of the set of vehicles, and transmit the live video stream to an external controller.

In another embodiment, a method for controlling a view, provided by a vehicular micro cloud, of a remotely supported vehicle, includes communicating with a plurality of vehicles in a vicinity of the vehicle to collectively form the vehicular micro cloud, each of the plurality of vehicles being equipped with at least one camera and tracking respective positions of the plurality of vehicles relative to the vehicle.

The method further includes selecting a set of vehicles from among the plurality of vehicles based at least in part on the respective positions of the plurality of vehicles, receiving a live video stream from each of the set of vehicles, and transmitting the live video stream to an external controller.

In still another embodiment, a non-transitory computer-readable medium for controlling a view, provided by a vehicular micro cloud, of a remotely supported vehicle, including instructions that, when executed by one or more processors, cause the one or more processors to communicate with a plurality of vehicles in a vicinity of the vehicle to collectively form the vehicular micro cloud, each of the plurality of vehicles being equipped with at least one camera, and track respective positions of the plurality of vehicles relative to the vehicle.

The instructions further cause the one or more processors to select a set of vehicles from among the plurality of vehicles based at least in part on the respective positions of the plurality of vehicles, receive a live video stream from each of the set of vehicles, and transmit the live video stream to an external controller.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with utilizing a vehicular micro cloud to aid in providing remote support (e.g., including remote driving) of a vehicle are disclosed. A vehicle capable of being remotely supported or driven by an operator at a control station may naturally be equipped with one or more cameras or other sensors that can obtain information about an environment around the vehicle. The vehicle may be further equipped to establish a communication link with the control station and to thereby transmit the information about the environment to the control station, as well as transmit information indicating operational parameters of the vehicle, position of the vehicle, etc. The transmission via the communication link occurs at a speed that allows the operator to consider the information in real time so that the operator can adequately respond to situations as they arise in issuing commands and/or navigating the vehicle through the environment without collision or other accidents.

When providing remote support of a motor vehicle in a public space it is essential for the operator to receive sufficient information regarding the environment around the vehicle (e.g., traffic, pedestrians, etc.) and activity taking place within the environment to allow the operator to make correct operational decisions. Conventional motor vehicle remote driving systems address this issue by installing multiple sensors (cameras, lidar, radar, etc.) on the vehicle to capture multiple views from the perspective of the vehicle and provide them to the operator. However, situations may arise in which sensors on the vehicle itself are inadequate for the task. For example, a camera on a vehicle may have a view that becomes blocked by a large vehicle, may become damaged or otherwise degraded (e.g., due to snow, mud, debris, etc.), may be in a position or angle that does not provide a view that is needed at the time, or may otherwise be limited in coverage so as to create one or more "blind spots" for the operator, that is, areas that the operator receives no information about. Any such conditions can leave the operator in a dangerous position in which the safety and lives of people in the vicinity of the remotely controlled vehicle are at risk.

Therefore, a remote viewing system and associated methods are disclosed herein that utilize a vehicular micro cloud to provide enhanced camera support for remote support. In one or more embodiments, the disclosed remote viewing system can communicate with a plurality of vehicles to collectively form the vehicular micro cloud, each of the plurality of vehicles being equipped with at least one camera, and track respective positions of the plurality of vehicles relative to a remotely controlled vehicle. The system can select a set of vehicles from among the plurality of vehicles based at least in part on the respective positions of the plurality of vehicles, receive a live video stream from each of the set of vehicles, and transmit the live video stream to an external controller (e.g., an operator control station).

In one or more embodiments, the disclosed remote viewing system can stitch the live video streams together into a panoramic video stream according to respective positions of a set of vehicles relative to the vehicle. In one implementation, the panoramic video stream can provide at least a 270-degree view around the vehicle. In another implementation, the panoramic video stream can provide a complete 360-degree view around the vehicle.

Figure 1:
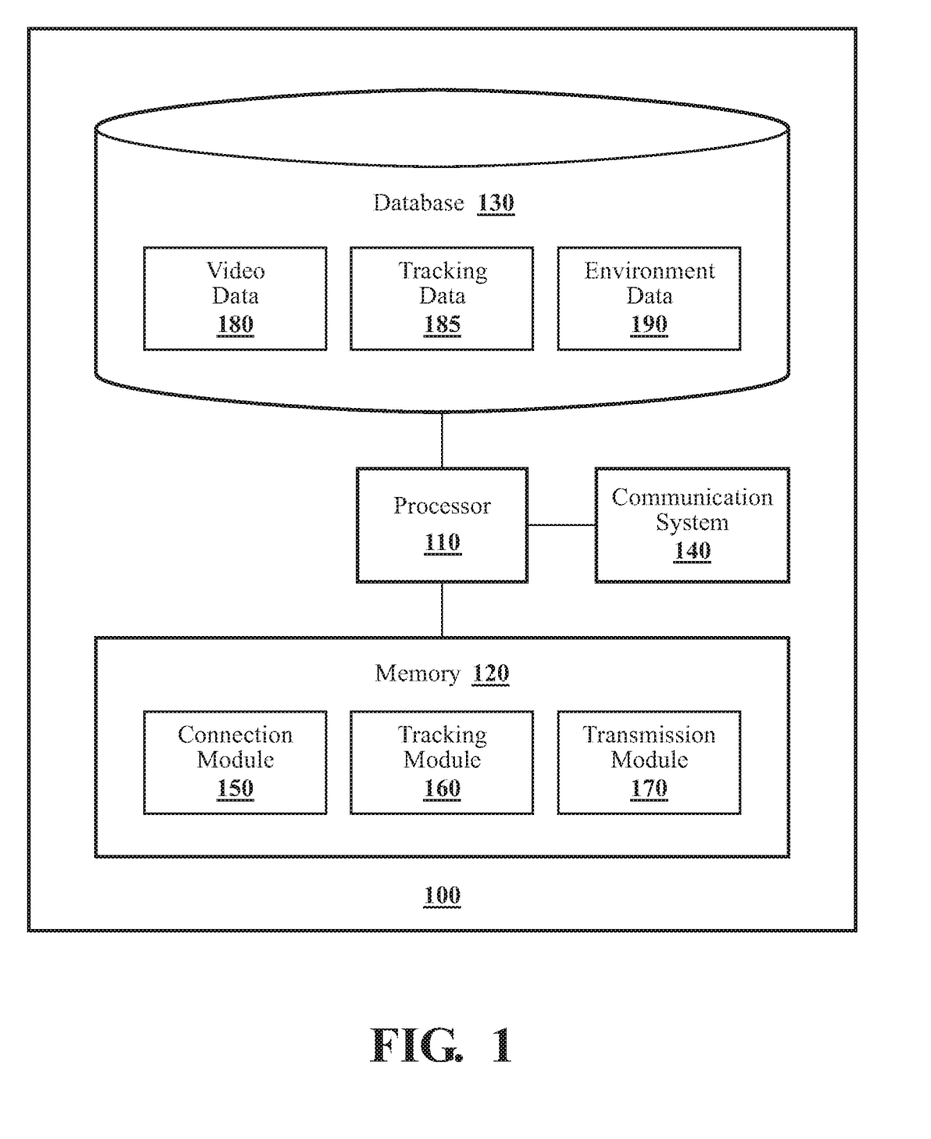
FIG. 1 illustrates one embodiment of a remote viewing system according to the disclosed embodiments.

Referring to FIG. 1, one example embodiment of a remote viewing system 100 is illustrated. The remote viewing system 100 can be implemented, for example, as a central server, a cloud server, an edge serve, a component of a vehicle system, a cloud-based computing device or other network-connected computing device that can communicate with one or more external devices, or a cluster of connected devices (e.g., road-side units, stationary vehicles, etc.). The remote viewing system 100 is shown including a processor 110, a memory 120, database 130, and a communication system 140. In other embodiments more or fewer components than those shown can be included according to an implementation of the disclosed subject matter.

In one or more embodiments, the processor 110 may be a part of the remote viewing system 100, or the remote viewing system 100 may access the processor 110 through a network communication. The processor 110 may be one or more processors according the processing power required per implementation.

The memory 120 can be implemented as a random-access memory (RAM), read-only memory (ROM), a hard-disk drive, a flash memory, or other suitable memory for storing, among other things, a connection module 150, a tracking module 160 and a transmission module 170. The modules 150, 160 and 170 will be described further below.

The database 130 can store, among other information, video data 180, tracking data 185 and environment data 190, which will also be described further below. The database 130 is, in one or more embodiments, an electronic data structure that can be a data store integral with the remote viewing system 100, a removable memory device that can be installed in or removed from the remote viewing system 100, or another network-based data store that is accessible to modules 150, 160 and 170 stored in the memory 120. In one or more embodiments the database 130 can be accessible to external systems, such as cloud or edge servers, micro cloud members, or road-side units. The database 130 is configured with routines that can be executed by the processor 110 for analyzing stored data, accessing and providing stored data, organizing stored data, and so on. Thus, in one embodiment, the database 130 stores and manages/updates data, such as video data 180, tracking data 185 and environment data 190, as well as other types of data that are used by modules 150, 160 and 170 in executing various functions.

The communication system 140 can be implemented, for example, as a wireless communication system including one or more transmitting/receiving devices, one or more transmitting/receiving antennas and a controller for transmitting and receiving data over a wireless network using any of a variety of protocols, such as vehicle-to-vehicle (V2V), vehicle-to-everything (V2X), general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The communication system 140 can also include vehicle-tocloud, vehicle-to-datacenter and any type of V2X communication protocol. In one or more embodiments, the communication system 140 can be configured to receive, for example, video data 180 and environment data 190 from one or more external entities, such as various members of the micro cloud and cloud/edge servers.

The modules 150, 160 and 170 can be, for example, constructed as computer-readable instructions that when executed by the processor 110 cause the processor 110 to perform the various functions disclosed herein.

The connection module 150 generally includes instructions that function to control the processor 110 to communicate with a plurality of vehicles in a vicinity of a vehicle being remotely supported to collectively form, along with the remotely supported vehicle, a vehicular micro cloud. Each of the vehicles that join the remotely controlled vehicle to form the vehicular micro cloud can be equipped with at least one camera. The connection module 150 can execute the communication using V2V, V2X or another suitable protocol via the communication system 140.

Regarding the formation of the vehicular micro cloud, in one or more embodiments the connection module 150 can broadcast or transmit a micro cloud formation request to vehicles in a geographic vicinity of the vehicle that is being (or soon will be) remotely supported (i.e., the "RS vehicle"). The request can include one or more conditional criteria, such as requiring that any responding vehicle that joins the micro cloud must have at least one camera equipped and must be capable of sharing a video stream from the at least one camera. In one or more embodiments other conditionals may be included, such as requesting current routing information from the responding vehicle and requiring the responding vehicle to have a route that aligns with the RS vehicle current route above at least a threshold travel distance, or requiring the responding vehicle to be capable of adjusting its current route to an altered route that meets the travel distance requirement.

The connection module 150 can include instructions to receive and filter responses to the micro cloud formation request and to establish communication connections between the RS vehicle and responding vehicles that meet conditionals, thereby forming a vehicular micro cloud including the RS vehicle and a plurality of the responding vehicles.

Figure 2A:
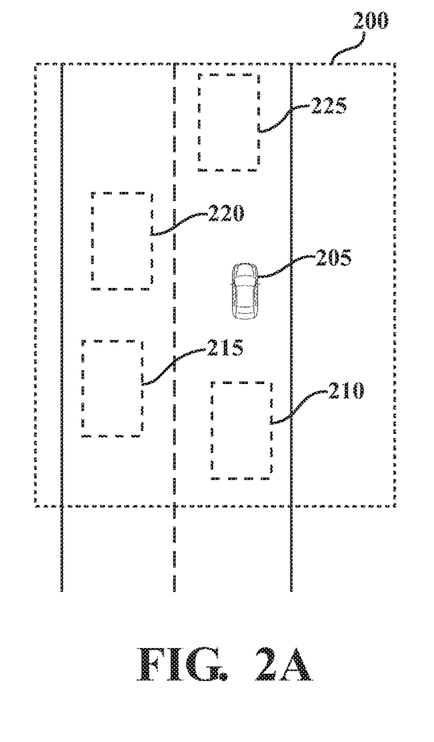
FIG. 2A-2B illustrate example position maps according to the disclosed embodiments.

In one or more embodiments, the connection module 150 can further include instructions to create a position map including a plurality of positions around the RS vehicle. FIG. 2A shows an example position map 200 for an RS vehicle 205. The position map 200 includes four positions 210, 215, 220, 225 disposed in an immediate vicinity around the RS vehicle 205. The connection module 150 may generate the position map 200, for example, when the RS vehicle 205 is traveling on a two-lane highway with light traffic. It should be understood, however, that the position map 200 is merely one example map provided for illustrative purposes to facilitate a better understanding of the disclosed subject matter. In implementation the connection module 150 can generate position maps having different layouts and different numbers of positions dependent upon, for example, geographic circumstances, traffic density, micro cloud member availability, etc., as will be discussed further below. For example, in one or more embodiments the connection module 150 can determine the number/layout for positions 210, 215, 220, 225 based on a predetermined map relative to the RS vehicle or dynamically according to the local circumstances (e.g., traffic density, number of lanes, etc.).

Even after formation of the vehicular micro cloud the connection module 150 can continue to monitor the size of the vehicular micro cloud to determine whether additional vehicle members are needed. For example, during travel the connection module 150 can determine that the current micro cloud members do not fill all the positions in the position map, resulting in one or more unfilled positions. The connection module 150 can detect the unfilled positions, for example, based on information from the tracking module 160 as discussed below, or based on the number of micro cloud members and/or the respective positions of the micro cloud members relative to the RS vehicle.

Figure 2B:
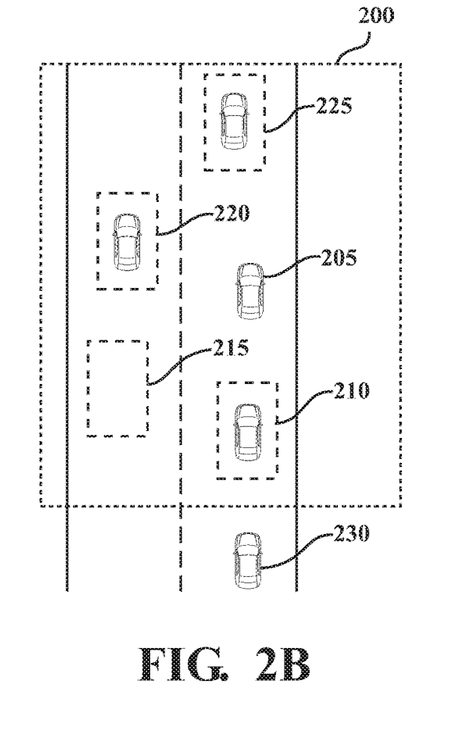

FIG. 2B illustrates a situation in which positions 210, 220 and 225 of position map 200 are filled with micro cloud members while position 215 is unfilled. When the connection module 150 detects an unfilled position 215, the connection module 150 can broadcast or transmit a request to an additional vehicle, e.g., vehicle 230, to join the vehicular micro cloud and fill the unfilled position 215. The request to join can have the same conditional criteria as the formation requests or can have different conditional criteria, for example, based on the current circumstances of the RS vehicle and the vehicular micro cloud.

Figure 3A:
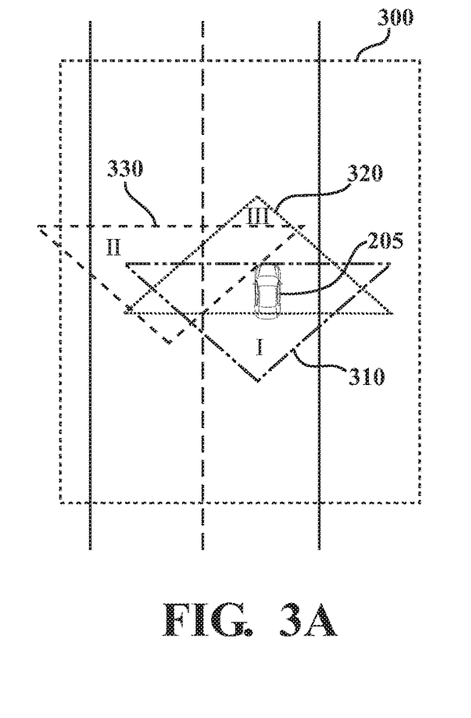
FIGS. 3A-3B illustrate example zone maps according to the disclosed embodiments.

In one or more embodiments, alternative to or in addition to a position map, the connection module 150 can include instructions to create a viewing zone map including a plurality of viewing zones around the RS vehicle. FIG. 3A illustrates an example viewing zone map 300 according to the disclosed embodiments. As shown, the viewing zone map 300 can include one or more viewing zones 310, 320, 330 that cover at least a portion of the immediate vicinity surrounding the RS vehicle 205. In one or more embodiments the viewing zones 310, 320, 330, may provide overlapping coverage and/or may provide coverage encompassing 360 degrees around the RS vehicle. It should be understood, however, that the zone map 300 is merely one example zone map provided for illustrative purposes to facilitate a better understanding of the disclosed subject matter. In implementation the zone map 300 can include a different number of zones having different placements, for example, depending on circumstances such as road geometry, number of lanes, traffic density, etc.

Figure 3B:
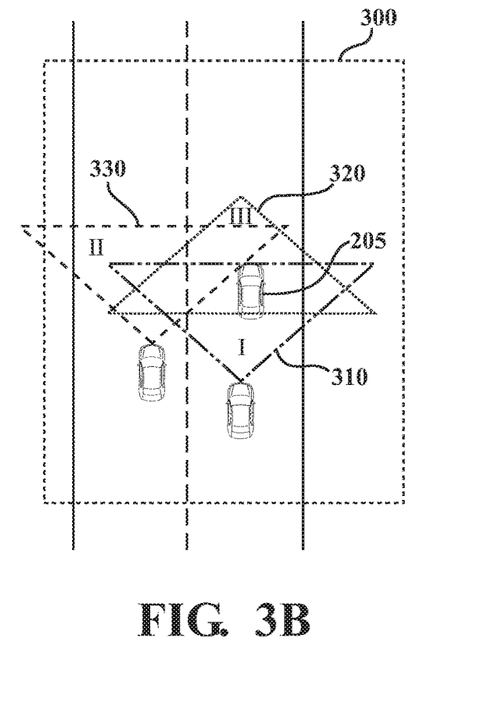

As will be discussed further below, the connection module 150 can determine, based on live video feeds from a selected viewing set of micro cloud members, that the selected viewing set currently does not provide coverage for all of the viewing zones, resulting in one or more uncovered viewing zones. For example, FIG. 3B shows zone I (310) and zone II (330) covered by micro cloud members while zone III (320) remains uncovered. The connection module 150 can transmit a request to one or more additional vehicles to join the vehicular micro cloud to cover the one or more uncovered viewing zones, e.g., zone III (320).

The tracking module 160 generally includes instructions that function to control the processor 110 to track one or more types of tracking data 185 for members of the vehicular micro cloud. The tracking data 185 can include respective positions of the micro cloud members relative to the RS vehicle. The tracking module 160 can include instructions to track the positions based on location information received from the micro cloud members, sensor data from sensors (e.g., camera, LIDAR, etc.) installed on the RS vehicle that can detect the micro cloud members, a different suitable source of location information for the micro cloud members (e.g., a cloud/edge server in communication with the micro cloud members), or a combination of such sources depending on implementation. For example, in one or more embodiments the tracking module 160 can track the positions in the form of absolute coordinate values based on GPS location information received from the micro cloud members. As another example, in one or more embodiments the tracking module 160 can track the positions in the form of locations relative to the RS vehicle, for example, based on sensor data from sensors (e.g., camera, LIDAR) installed on the RS vehicle.

In one or more embodiments, the tracking module 160 can include instructions to obtain, for one or more of the micro cloud members, tracking data 185 that includes camera information that indicates one or more of an orientation, installation position, quality level, and operational status for at least one camera installed on the micro cloud member. For example, the tracking module 160 can transmit a request for camera information to a given micro cloud member, and the micro cloud member can respond with information indicating that the member has one rear-facing, low-resolution camera and two front-facing high-resolution cameras.

In addition, in one or more embodiments, the tracking module 160 can include instructions to obtain, for one or more of the micro cloud members, tracking data 185 that includes destination information indicating respective travel destinations for the one or more of the plurality of vehicles. The destination information can be in the form, for example, of an address, a landmark, or other type of destination.

Figure 4:
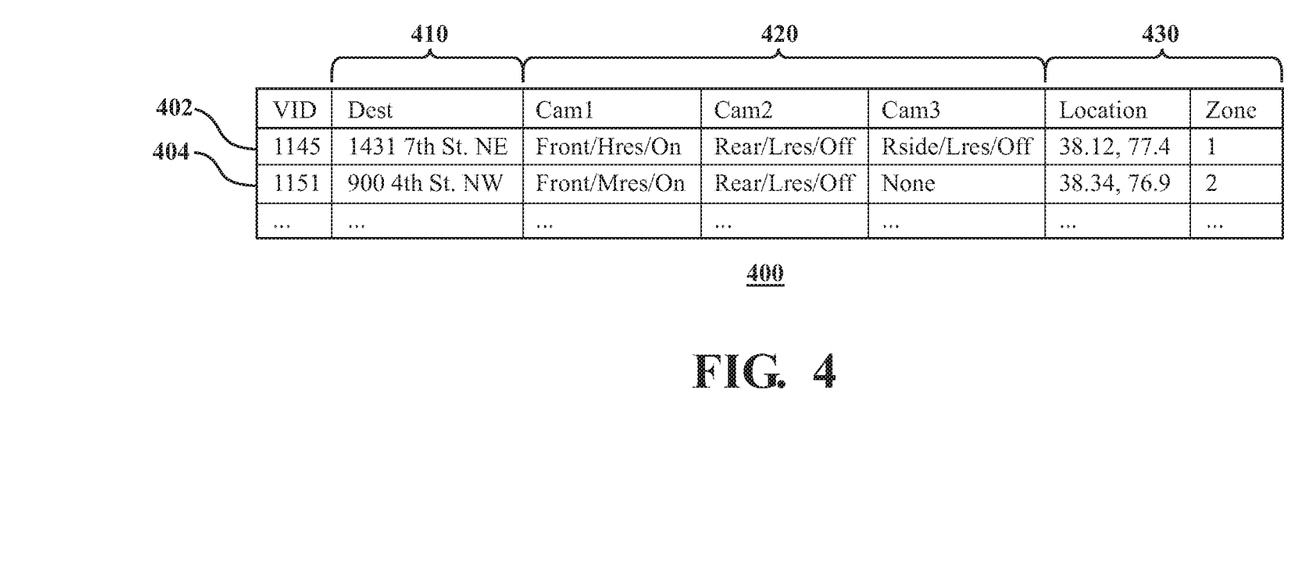
FIG. 4 illustrates an example database table of tracking information according to the disclosed embodiments.

FIG. 4 shows an example database table 400 of tracking data 185 that the tracking module 160 can update, including tracking destination information 410, camera information 420 and location information 430 for micro cloud members 402, 404. For example, destination information 410 can include an address that that the member is traveling to. Camera information 420 can include an installation location (e.g., front, rear, right side, etc.), resolution (e.g., high resolution, medium resolution, low resolution, etc.), and operational status (e.g., on, off, disabled, etc.). Location information 430 can include absolute coordinates (e.g., latitude and longitude) and a position or zone that the member is within or covering according to a position map or zone map for the RS vehicle as discussed above.

It should be understood that the database table 400 is merely an example provided for illustrative purposes to better facilitate understanding of the disclosed embodiments. Implementations of the disclosed subject matter can include different monitored types of data and in greater or less detail or granularity according to implementation. In any case, by obtaining and tracking various types of tracking data 185 associated with members of the vehicular micro cloud the tracking module 160 can inform other modules 150, 170, regarding various operational decisions, as will be discussed further below.

The transmission module 170 generally includes instructions that function to control the processor 110 to select a viewing set of vehicles from among the micro cloud members, receive a live video stream from each of the viewing set vehicles, and transmit the live video streams to an external controller (e.g., an operator control station, operator control device, etc.). Each of the live video streams can provide a different or unique view that is associated with the RS vehicle. As used herein, a view "associated" with the RS vehicle refers to a view that does one or more of: includes the RS vehicle, shows a view that is in the vicinity of the RS vehicle but does not include the RS vehicle, or shows a perspective relevant to a decision making process of an operator of the RS vehicle.

Further processing of the live video streams can occur on the operator side or on the side of the remote viewing system 100. For example, in one or more embodiments the transmission module 170 can include instructions to combine or "stitch" the live video streams together into a panoramic video stream in accordance with respective positions of set of vehicles relative to the vehicle. That is, for example referring to FIG. 2B, the transmission module 170 can determine that micro cloud members respectively covering zone I (310) and zone II (330) are beside each other and covering overlapping areas. The transmission module 170 can include instructions to identify overlapping portions of video from zones 310 and 330 and crop the videos as required to stitch the videos together and approximate a continuous view across both zones 310 and 330.

In one or more embodiments, the transmission module 170 can include instructions to create a stitched video that provides at least a 270-degree panoramic view associated with the RS vehicle. In one or more embodiments, when possible the transmission module 170 can include instructions to create a stitched video that provides a full 360-degree panoramic view associated with the RS vehicle.

Furthermore, in one or more embodiments the transmission module 170 can include instructions to determine that multiple micro cloud members currently provide at least partial coverage of a same viewing zone. For example, the transmission module 170 can apply object detection techniques or video frame comparison to identify similar or overlapping coverage of video streams from two different micro cloud members. The transmission module 170 can apply respective identifiers to the micro cloud members and transmit the identifiers in association with the live video feed to allow the operator to select a preferred feed. In response, the transmission module 170 can receive a transmission from the operator of a selected identifier and adjust the viewing set of vehicles to include a vehicle corresponding to the selected identifier.

An example operation of the disclosed remote viewing system 100 will now be discussed. Variable parameters, such as the size/formation of the micro cloud, are merely examples set for illustrative purposes to facilitate a better understanding of the disclosed subject matter and are not limiting.

In an example operation, when remote support is initiated for an RS vehicle, the disclosed remote viewing system 100 searches for nearby vehicles that can join the RS vehicle to form a vehicular micro cloud. The search may be executed, for example, by the connection module 150 broadcasting a request to vehicles within a given range of the RS vehicle.

Figure 5A:
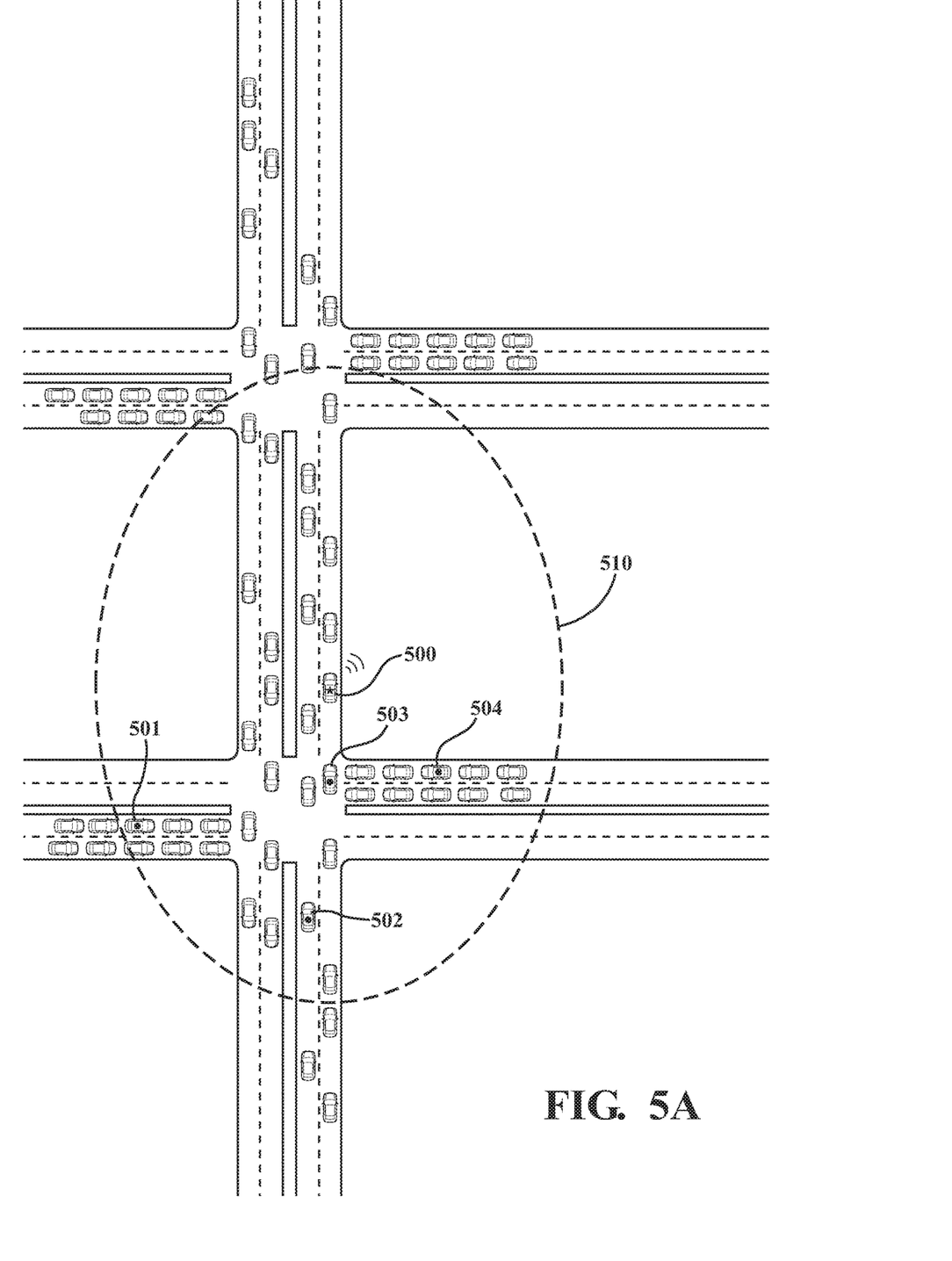
FIG. 5A illustrates an example scenario of a remotely controlled vehicle broadcasting a request according to the disclosed embodiments.

FIG. 5A illustrates an example scenario of an RS vehicle 500 broadcasting a request to vehicles within a range 510. It should be understood that broadcasting a request from the RS vehicle 500 is merely one way the disclosed remote viewing system 100 can search for potential vehicular micro cloud members. For example, in one or more embodiments the connection module 150 can transmit the request to a cloud/edge server which in turn broadcasts the request to a wider range or transmits the request directly to pre-determined participating vehicles in the geographic region or otherwise disseminates the request to multiple, local vehicles.

In any case, the request can include parameters for joining the micro cloud, such as communication requirements, camera requirements, and routing requirements. As will be discussed below, the connection module 150 filters positive responses to the request and establishes connections with suitable vehicles to form a vehicular micro cloud.

The connection module 150 can take account of one or more different factors to determine preferred parameters for forming the micro cloud. For example, the connection module 150 can obtain environmental information regarding the vicinity around the RS vehicle 500 from multiple sources, such as sensor data from sensors on the RS vehicle 500, location and map data from a navigational system of the RS vehicle 500, and relevant data obtained from external servers, such as weather reports or traffic reports. The environmental information can indicate, for example, a number of lanes on the road that the RS vehicle 500 is traveling, density of traffic, traveling speed, weather, etc. The environmental information can be stored as environment data 190 in the database 130.

In one or more embodiments, the connection module 150 can execute an instantiation algorithm that receives the environmental information as input and outputs a preferred vehicular micro cloud size and formation. In one implementation the instantiation algorithm may start at a default micro cloud size and increment or decrement the size based on the inputs, and similarly start at a default micro cloud formation and adjust the formation according to the micro cloud size and the inputs. For example, the instantiation algorithm may start with a default micro cloud size of three vehicles in a default in-line formation (i.e., one member vehicle in front of the RS vehicle and one member vehicle behind the RS vehicle traveling single file in one lane) and determine whether to adjust the size and formation based on the environmental information inputs.

An example lane rule of the instantiation algorithm may be to increment the micro cloud size by one per additional lane. An example traffic density rule of the instantiation algorithm may be to start at a medium density default assumption, increment by one above a higher traffic density threshold and decrement by one beneath a lower traffic density threshold. Similar rules may be formulated in response to different types of environmental information, such as traffic flow/speed, weather, road conditions, road geometry, map information, proximity to landmark features, distance from destination, etc. Additional rules may further include redundancy rules, for example, to account for frequent changes which may occur in a vehicular micro cloud membership base as members enter/exit the micro cloud.

In one or more embodiments, the connection module 150 can use a simplified method to determine micro cloud preferred parameters. For example, the connection module 150 can include a look-up table to determine preferred parameters according to a limited set of data. For example, in one implementation the size and formation of the micro cloud can be determined strictly based on the number of lanes in the road that the RS vehicle is traveling on.

In any case, the connection module 150 can determine preferred parameters of the micro cloud based at least in part on available environmental information. The preferred parameters can include a size range of the vehicular micro cloud and a formation for the micro cloud.

Referring to the example situation illustrated in FIG. 5A, the connection module 150 can determine an environmental information indication that two lanes are available, that the traffic is of medium density and flowing smoothly at a current speed of 40 mph, and the weather is fair. Based on these inputs, the connection module 150 can, for example, execute an instantiation algorithm that outputs preferred micro cloud parameters including a size of five members and a formation that covers zones similar to the zone pattern shown FIGS. 3A and 3B.

When the connection module 150 transmits or broadcasts the request to vehicles to join the vehicular micro cloud, the connection module 150 may receive more responses to the request than is required to meet the preferred micro cloud parameters. Continuing the example of FIG. 5A, while four members are sought, nine may respond. In the case of excessive responses, the connection module 150 can filter the responses to select the members based on factors such as camera quality, number of cameras, route matching (i.e., how long the responding vehicle and the RS vehicle 500 will share a similar route), current proximity to the RS vehicle 500, etc. For example, multiple factors can be weighted and each responding potential member given a rating based on the weighted factors to determine which members have the highest ratings and are accordingly selected to form the micro cloud.

The connection module 150 may select and establish connections with vehicles that are in the immediate proximity of the RS vehicle 500, or with vehicles that are currently traveling some distance away from the RS vehicle 500, or any mix of thereof. Referring back to FIG. 5A, in this example the connection module 150 selects and establishes connections with vehicle members 501, 502, 503, and 504. The vehicle members 501, 502, 503, and 504 may be dispersed at the time of selection. That is, initially the vicinity of the RS vehicle 500 may resemble FIG. 2A, which shows RS vehicle 205 isolated and designated positions 210, 215, 220, 225 around the RS vehicle unfilled.

Upon selection and connection of the micro cloud members, the vehicular micro cloud is formed. The vehicle members initiate navigation into positions around the vicinity of the RS vehicle and the tracking module 160 initiates obtaining and updating tracking information for the vehicle members. The tracking information includes at least position information for each of the micro cloud members and can further include, for example, routing/destination information, camera information and location information as shown in FIG. 4, or a different combination of data associated with the micro cloud vehicle members. The tracking module 160 can store and update the tracking information as tracking data 185 in the database 130 (FIG. 1).

Figure 5B:
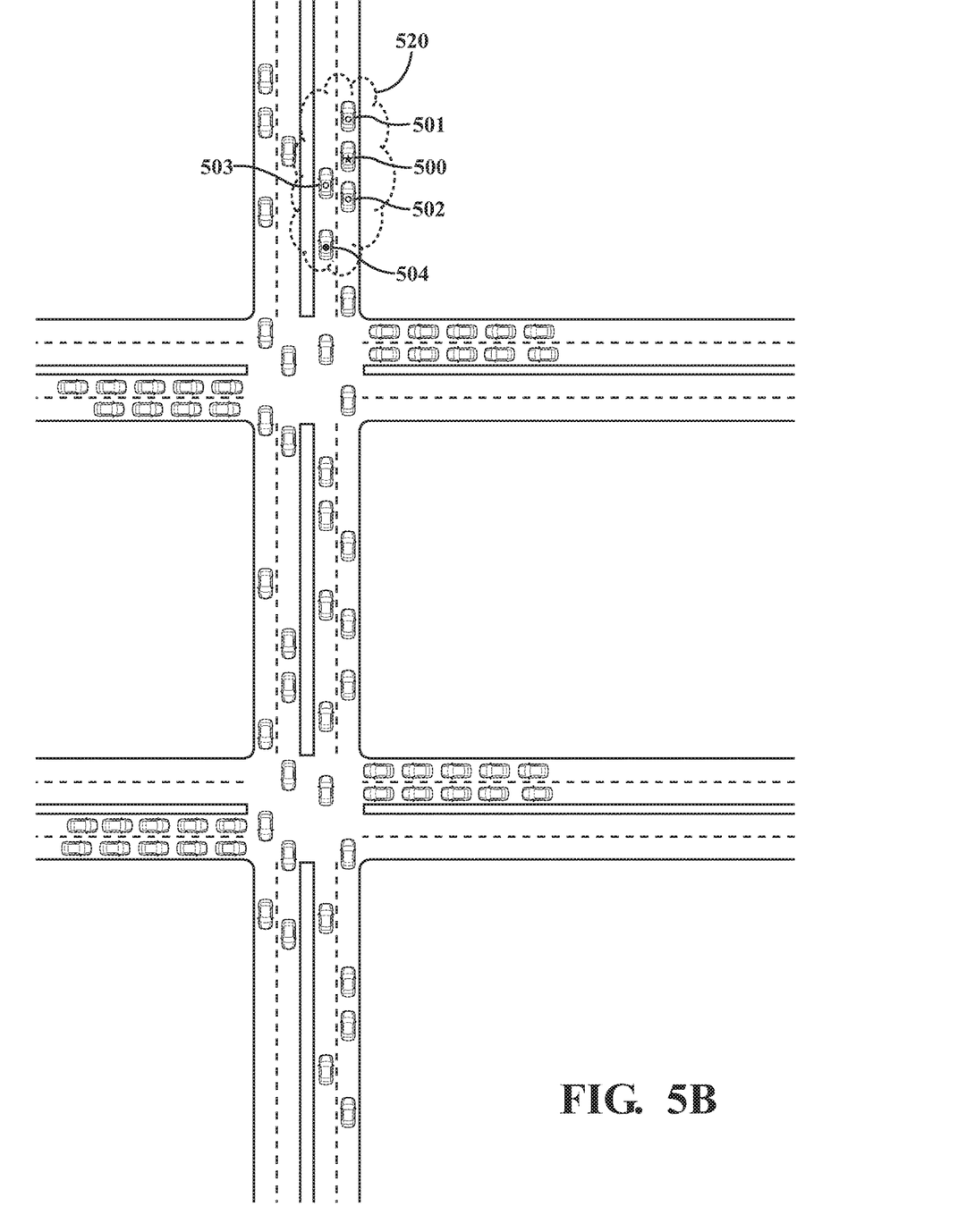
FIG. 5B illustrates the example scenario at a later point in time after formation of the vehicular micro cloud according to the disclosed embodiments.

FIG. 5B shows the RS vehicle 500 at a point in time after formation of the vehicular micro cloud 520. The selected vehicle members 501, 502, 503, 504 have navigated into positions within the vicinity of the RS vehicle 500.

The transmission module 170 can select a viewing set of vehicles from among the vehicular micro cloud members 501, 502, 503, 504. For example, the transmission module 170 can determine, based at least in part on the tracking data 185, that vehicle members 501, 502 and 503 are in position to cover zones I, II, and III as designated by zone map 300 (FIG. 3A). Accordingly, the transmission module 170 can select vehicle members 501, 502 and 503 to be designated as the viewing set. Vehicle member 504 may remain a redundant member that may swap into any position as needed, for example, due to a member of the viewing set exiting the vehicular micro cloud, malfunction of a camera sensor of a member of the viewing set, communication error occurring etc.

The transmission module 170 can receive a live video stream from each vehicle member 501, 502 and 503 in the viewing set and transmit the live video stream to an external controller, e.g., the operator control station or another device utilized by the operator to control or issue commands to the RS vehicle 500. In one or more embodiments, the transmission module 170 can store the live streams as temporary video data 180 in the database 130 (FIG. 1), stitch together the live video streams into a panoramic video stream in accordance with respective positions of the viewing set of vehicles relative to the vehicle and transmit the panoramic video stream to the operator. In one or more embodiments, the panoramic video stream can provide at least a 270-degree view associated with the RS vehicle 500. In one or more embodiments, depending on the micro cloud formation and number of vehicle members participating, the panoramic video stream can provide a full 360-degree view associated with the RS vehicle 500.

When excessive member vehicles are present in the vehicular micro cloud 520 (i.e., more members are present than are required for a given position map or zone map), the transmission module 170 may select the viewing set based on distinguishing factors, such as camera information (e.g., number of cameras, orientations, quality levels, operational statuses, etc.) and/or destination information (e.g., travel destination, routing information, etc.) as indicated in the tracking data 185.

Furthermore, the transmission module 170 may determine that two or more members are providing or are capable of providing similar or overlapping video coverage of a view associated with the RS vehicle 500. The transmission module 170 can, in this circumstance, assign an identifier to each view and transmit a request to the operator to select a preferred view. The transmission module 170 can receive a selection of a preferred view and adjust the viewing set to include the vehicle member corresponding to the preferred view.

Accordingly, the disclosed remote viewing system 100 can establish and maintain a vehicular micro cloud to support remote operation of an RS vehicle by obtaining and transmitting live video feeds of one or more views associated with the RS vehicle via members of the vehicular micro cloud. The disclosed remote viewing system 100 can monitor the results of the live video feed transmission and continually attempt to adjust the results based on environmental circumstances and improve the results (e.g., replace a vehicle member having a low resolution camera with a vehicle member having a high resolution camera, etc.).

Furthermore, the disclosed remote viewing system 100 can take proactive action to maintain established camera views. For example, based on tracking information (i.e., including route/destination information) of current members, the disclosed remote viewing system 100 can transmit/broadcast messages to additional vehicles in the vicinity of the RS vehicle requesting the additional vehicles to join the micro cloud before current members exit the vehicular micro cloud. Moreover, if no additional vehicles respond in the vicinity, the disclosed remote viewing system 100 can expand the range and/or request that other vehicles be re-routed to join the vehicular micro cloud so that a seamless camera view is ensured.

Figure 6:
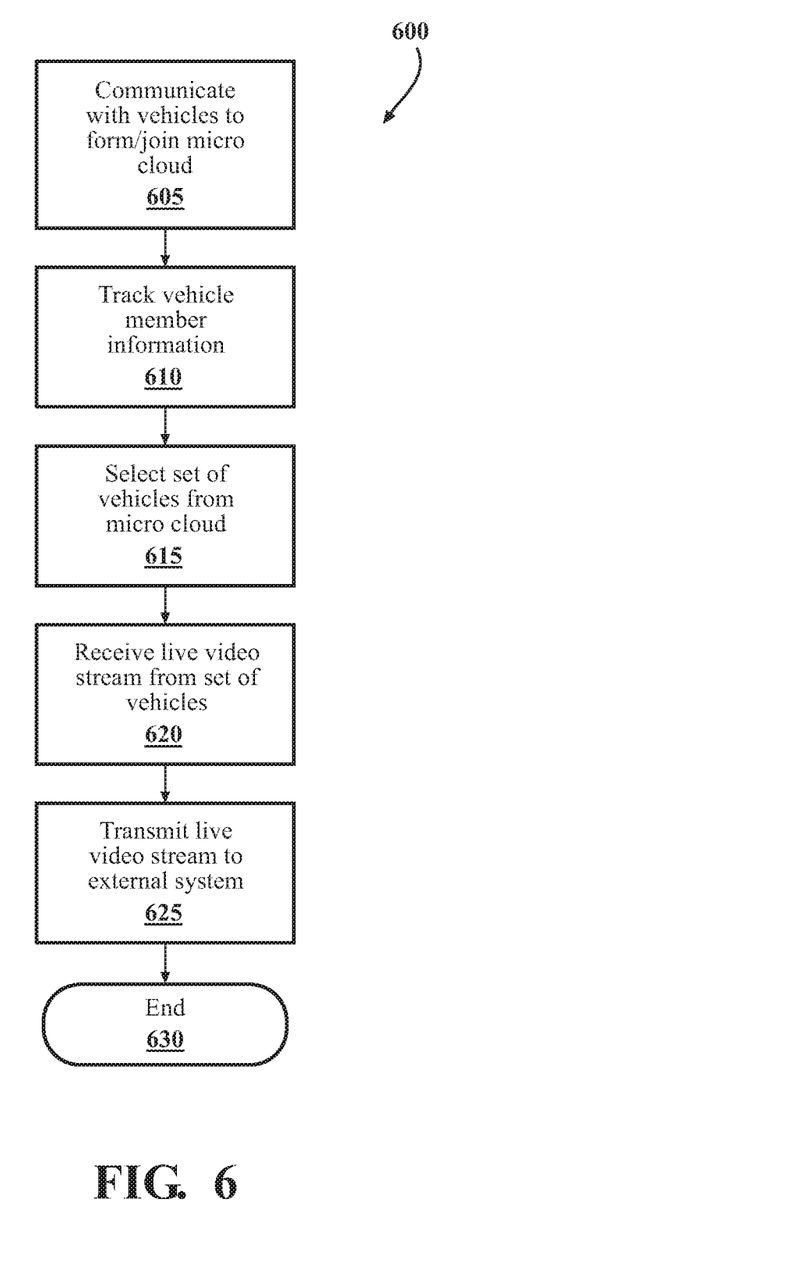
FIG. 6 illustrates a flowchart of a method of utilizing a vehicular micro cloud to obtain and transmit multiple live video feed views associated with a remotely controlled vehicle according to the disclosed embodiments.

FIG. 6 illustrates a flowchart of a method 600 of utilizing a vehicular micro cloud to obtain and transmit multiple live video feed views associated with an RS vehicle according to the disclosed embodiments. Method 600 will be discussed from the perspective of the remote viewing system 100 of FIG. 1. While method 600 is discussed in combination with the remote viewing system 100, it should be understood that the method 600 is not limited to implementation within the remote viewing system 100, which is merely one example of a system that may implement the method 600. It should further be understood that the order of operations can change in various implementations of the method 600.

At operation 605, the remote viewing system 100 (e.g., connection module 150) communicates with a plurality of vehicles in a vicinity of the RS vehicle to establish connections that allow the plurality of vehicles and the RS vehicle to collectively form (or join) a vehicular micro cloud. In one or more embodiments, each of the plurality of vehicles that join the vehicular micro cloud meet a minimum requirement of at least being equipped with at least one camera.

At operation 610, the remote viewing system 100 (e.g., tracking module 160) tracks at least respective positions of the plurality of vehicles relative to the vehicle. The tracking module 160 can further track additional information, such as camera information and destination information.

At operation 615, the remote viewing system 100 (e.g., transmission module 170) selects a set of vehicles from among the plurality of vehicles. The transmission module 170 can select the vehicles based at least in part on the respective positions. The transmission module 170 can select the vehicles based further in part on the camera information and/or the destination information.

At operation 620, the transmission module 170 receives a live video stream from each of the set of vehicles.

At operation 625, the transmission module 170 transmits each live video stream to an external system. In one or more embodiments the transmission module 170 can stitch multiple live video streams together to form a panoramic view associated with the RS vehicle and transmit the panoramic video to the external system (e.g., operator control station).

The method ends at 630. However, the disclosed system 100 can repeatedly execute the method 600 to continually track vehicle members, request additional members join the vehicular micro cloud (e.g., replacement or redundant members or to ensure seamless camera view), and update the set of vehicles that are providing the live video stream. For example, in one or more embodiments the transmission module 170 can update the set of vehicles to replace one or more vehicles, for example, to upgrade the live video stream with an improved camera, to incorporate a preferred view as indicated by a communication from the operator, or to fill a position/cover a zone left unfilled/uncovered by the exit of a vehicle member. Thus, the disclosed remote viewing system 100 can continually monitor for opportunities to improve the live video stream.

Furthermore, in one or more embodiments the disclosed remote viewing system 100 can function as part of a reward system that provides rewards as incentives for vehicles participating in the live video stream operation. For example, redeemable points may be awarded for each mile a micro cloud vehicle member travels while providing a live video stream in support of operating an RS vehicle within the method of the system 100.

As discussed above, the remote viewing system 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data stores of the remote viewing system (e.g., database 130) may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1, 2A, 2B, 3A, 3B, 4, 5A, 5B, and 6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling a view, provided by a vehicular micro cloud, of a remotely supported vehicle, comprising:
 a communication system configured to transmit/receive communications between the system and members of the vehicular micro cloud;

one or more processors; and a memory communicably coupled to the one or more processors and storing:

a first set of instructions that when executed by the one or more processors cause the one or more processors to communicate with a plurality of vehicles in a vicinity of the remotely supported vehicle to collectively form the vehicular micro cloud, each of the plurality of vehicles being equipped with at least one camera;

a second set of instructions that when executed by the one or more processors cause the one or more processors to:

track respective positions of the plurality of vehicles relative to the remotely supported vehicle, and obtain, for one or more of the plurality of vehicles, camera information indicating one or more of an orientation, a quality level, or an operational status for at least one respectively equipped camera; and a third set of instructions that when executed by the one or more processors cause the one or more processors to select a set of vehicles from among the plurality of vehicles based at least in part on the respective positions of the plurality of vehicles and the camera information, receive a live video stream from each of the set of vehicles, and transmit the live video stream from the each of the set of vehicles to an external controller, wherein each of the live video streams provides a unique view associated with the remotely supported vehicle.

2. The system of claim 1, wherein the third set of instructions further includes instructions that cause the one or more processors to:

stitch the live video streams together into a panoramic video stream in accordance with respective positions of the set of vehicles relative to the remotely supported vehicle.

3. A system for controlling a view, provided by a vehicular micro cloud, of a remotely supported vehicle, comprising:

a communication system configured to transmit/receive communications between the system and members of the vehicular micro cloud;

one or more processors; and a memory communicably coupled to the one or more processors and storing:

a first set of instructions that when executed by the one or more processors cause the one or more processors to communicate with a plurality of vehicles in a vicinity of the remotely supported vehicle to collectively form the vehicular micro cloud, each of the plurality of vehicles being equipped with at least one camera;

a second set of instructions that when executed by the one or more processors cause the one or more processors to:

track respective positions of the plurality of vehicles relative to the remotely supported vehicle, and obtain, for one or more of the plurality of vehicles, destination information indicating respective travel destinations for the one or more of the plurality of vehicles; and a third set of instructions that when executed by the one or more processors cause the one or more processors to select a set of vehicles from among the plurality of vehicles based at least in part on the respective positions of the plurality of vehicles and the destination information, receive a live video stream from each of the set of vehicles, and transmit the live video stream from the each of the set of vehicles to an external controller, wherein each of the live video streams provides a unique view associated with the remotely supported vehicle.

4. The system of claim 3, wherein the first set of instructions further includes instructions that cause the one or more processors to:

create a position map including a plurality of positions around the remotely supported vehicle;

determine, based on the respective positions of the plurality of vehicles relative to the remotely supported vehicle, that the plurality of vehicles do not fill all the positions in the position map, resulting in one or more unfilled positions; and transmit a request to one or more additional vehicles to join the vehicular micro cloud and fill the one or more unfilled positions.

5. The system of claim 1, wherein the first set of instructions further includes instructions that cause the one or more processors to:

create a viewing zone map including a plurality of viewing zones around the remotely supported vehicle;

determine, based on the live video streams, that the set of vehicles does not provide coverage for all of the viewing zones, resulting in one or more uncovered viewing zones; and transmit a request to one or more additional vehicles to join the vehicular micro cloud and cover the one or more uncovered viewing zones.

6. The system of claim 5, wherein the third set of instructions further includes instructions that cause the one or more processors to:

determine that multiple vehicles among the plurality of vehicles provide at least partial coverage of a same viewing zone among the plurality of viewing zones;

apply identifiers to the multiple vehicles;

transmit the identifiers in association the live video streams;

receive a transmission of a selected identifier; and adjust the set of vehicles to include a vehicle corresponding to the selected identifier.

7. A method for controlling a view, provided by a vehicular micro cloud, of a remotely supported vehicle, comprising:

communicating with a plurality of vehicles in a vicinity of the remotely supported vehicle to collectively form the vehicular micro cloud, each of the plurality of vehicles being equipped with at least one camera;

tracking respective positions of the plurality of vehicles relative to the remotely supported vehicle;

obtaining, for one or more of the plurality of vehicles, camera information indicating one or more of an orientation, a quality level, or an operational status for at least one respectively equipped camera;

selecting a set of vehicles from among the plurality of vehicles based at least in part on the respective positions of the plurality of vehicles and the camera information;

receiving a live video stream from each of the set of vehicles; and transmitting the live video stream from the each of the set of vehicles to an external controller.

8. A method for controlling a view, provided by a vehicular micro cloud, of a remotely supported vehicle, comprising:
- communicating with a plurality of vehicles in a vicinity of the remotely supported vehicle to collectively form the vehicular micro cloud, each of the plurality of vehicles being equipped with at least one camera;
- tracking respective positions of the plurality of vehicles relative to the remotely supported vehicle;
- obtaining, for one or more of the plurality of vehicles, destination information indicating respective travel destinations for the one or more of the plurality of vehicles;
- selecting a set of vehicles from among the plurality of vehicles based at least in part on the respective positions of the plurality of vehicles and the destination information;
- receiving a live video stream from each of the set of vehicles; and
- transmitting the live video stream from the each of the set of vehicles to an external controller.

9. The method of claim 8, further comprising requesting at least one vehicle to adjust a route in order to meet with and join the vehicular micro cloud.

10. The method of claim 8, further comprising:
- creating a position map including a plurality of positions around the remotely supported vehicle;
- determining, based on the respective positions of the plurality of vehicles relative to the remotely supported vehicle, that the plurality of vehicles do not fill all the positions in the position map, resulting in one or more unfilled positions; and
- transmitting a request to one or more additional vehicles to join the vehicular micro cloud and fill the one or more unfilled positions.

11. The method of claim 7, further comprising:
- creating a viewing zone map including a plurality of viewing zones around the remotely supported vehicle;
- determining, based on live video streams, that the set of vehicles does not provide coverage for all of the viewing zones, resulting in one or more uncovered viewing zones; and
- transmitting a request to one or more additional vehicles to join the vehicular micro cloud and cover the one or more uncovered viewing zones.

12. The method of claim 11, further comprising:
- determining that multiple vehicles among the plurality of vehicles provide at least partial coverage of a same viewing zone among the plurality of viewing zones;
- applying identifiers to the multiple vehicles;
- transmitting the identifiers in association the live video streams;
- receiving a transmission of a selected identifier; and
- adjusting the set of vehicles to include a vehicle corresponding to the selected identifier.

13. A non-transitory computer-readable medium for controlling a view, provided by a vehicular micro cloud, of a remotely supported vehicle, including instructions that, when executed by one or more processors, cause the one or more processors to:
- communicate with a plurality of vehicles in a vicinity of the remotely supported vehicle to collectively form the vehicular micro cloud, each of the plurality of vehicles being equipped with at least one camera;
- track respective positions of the plurality of vehicles relative to the remotely supported vehicle;
- obtain, for one or more of the plurality of vehicles, camera information indicating one or more of an orientation, a quality level, or an operational status for at least one respectively equipped camera;
- select a set of vehicles from among the plurality of vehicles based at least in part on the respective positions of the plurality of vehicles and the camera information;
- receive a live video stream from each of the set of vehicles; and
- transmit the live video stream from the each of the set of vehicles to an external controller.

14. The non-transitory computer-readable medium of claim 13, further comprising instructions that cause the one or more processors to:
- stitch live video streams together into a panoramic video stream in accordance with respective positions of the set of vehicles relative to the remotely supported vehicle.

15. A non-transitory computer-readable medium for controlling a view, provided by a vehicular micro cloud, of a remotely supported vehicle, including instructions that, when executed by one or more processors, cause the one or more processors to:
- communicate with a plurality of vehicles in a vicinity of the remotely supported vehicle to collectively form the vehicular micro cloud, each of the plurality of vehicles being equipped with at least one camera;
- track respective positions of the plurality of vehicles relative to the remotely supported vehicle;
- obtain, for one or more of the plurality of vehicles, destination information indicating respective travel destinations for the one or more of the plurality of vehicles;
- select a set of vehicles from among the plurality of vehicles based at least in part on the respective positions of the plurality of vehicles and the destination information;
- receive a live video stream from each of the set of vehicles; and
- transmit the live video stream from the each of the set of vehicles to an external controller.

16. The non-transitory computer-readable medium of claim 15, further comprising instructions that cause the one or more processors to:
- create a position map including a plurality of positions around the remotely supported vehicle;
- determine, based on the respective positions of the plurality of vehicles relative to the remotely supported vehicle, that the plurality of vehicles do not fill all the positions in the position map, resulting in one or more unfilled positions; and
- transmit a request to one or more additional vehicles to join the vehicular micro cloud and fill the one or more unfilled positions.

17. The non-transitory computer-readable medium of claim 13, further comprising instructions that cause the one or more processors to:
- create a viewing zone map including a plurality of viewing zones around the remotely supported vehicle;
- determine, based on live video streams, that the set of vehicles does not provide coverage for all of the viewing zones, resulting in one or more uncovered viewing zones; and
- transmit a request to one or more additional vehicles to join the vehicular micro cloud and cover the one or more uncovered viewing zones.

18. The system of claim 1, wherein the first set of instructions further includes instructions that cause the one or more processors to include in a communication with the plurality of vehicles a requirement that a candidate vehicle to join the vehicular micro cloud must be capable of sharing a respective video stream from a camera of the candidate vehicle.

19. The system of claim 3, wherein the instructions to track the respective positions of the plurality of vehicles include instructions to track, using sensor data from at least one sensor installed on the remotely supported vehicle, the respective positions of the plurality of vehicles.

20. The system of claim 3, wherein the second set of instructions further include instructions to track, using information received from at least one vehicle that is a member of the vehicular micro cloud, absolute coordinate values of positions of the plurality of vehicles.

* * * * *